United States Patent
Korb et al.

[15] 3,667,563
[45] June 6, 1972

[54] SUPPORTING STRUCTURE FOR PLATFORM DEFINING FUEL AND BATTERY COMPARTMENT

[72] Inventors: Eugene V. Korb, West Allis; Robert C. Haupt, Milwaukee, both of Wis.

[73] Assignee: Allis-Chalmers Manufacturing Company, Milwaukee, Wis.

[22] Filed: Nov. 21, 1969

[21] Appl. No.: 878,748

[52] U.S. Cl. ..............................180/68.5, 280/5
[51] Int. Cl. ..........................................B62d 25/00
[58] Field of Search.................................180/68.5; 280/5

[56] References Cited

UNITED STATES PATENTS

| | | | |
|---|---|---|---|
| 1,138,122 | 5/1915 | Lambert et al. | 180/68.5 |
| 2,360,056 | 10/1944 | Heitshu | 180/68.5 |
| 3,275,092 | 9/1966 | Matthews | 180/68.5 |

*Primary Examiner*—Arthur L. La Point
*Assistant Examiner*—Richard A. Bertsch
*Attorney*—Arthur L. Nelson, Kenneth C. McKivett and Robert B. Benson

[57] ABSTRACT

Platform support structure on a tractor having access steps to the platform level and providing supporting structure for a fuel tank and battery compartment. The fuel tank and battery compartments are supported at a level below the operator platform of the vehicle.

11 Claims, 6 Drawing Figures

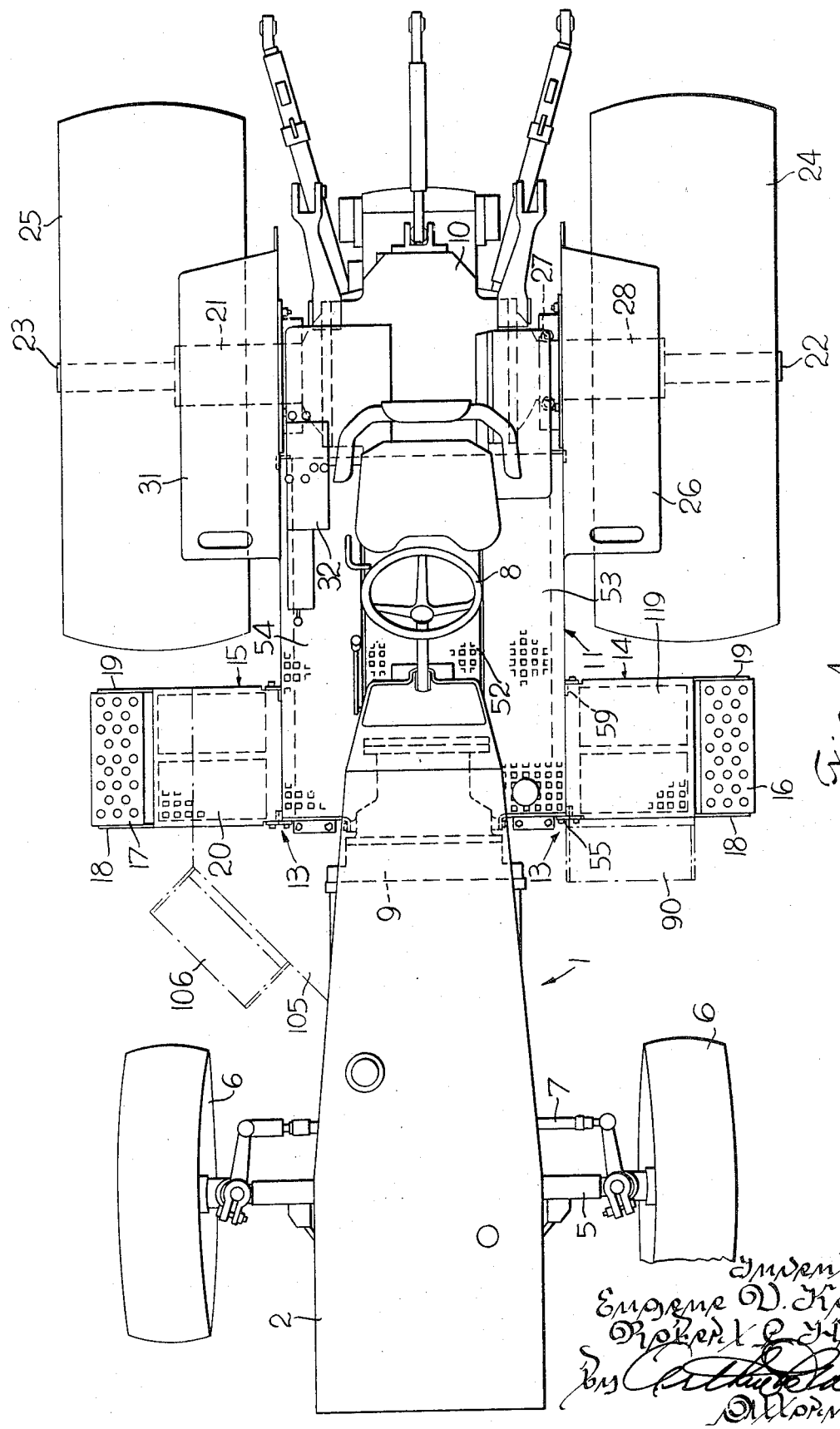

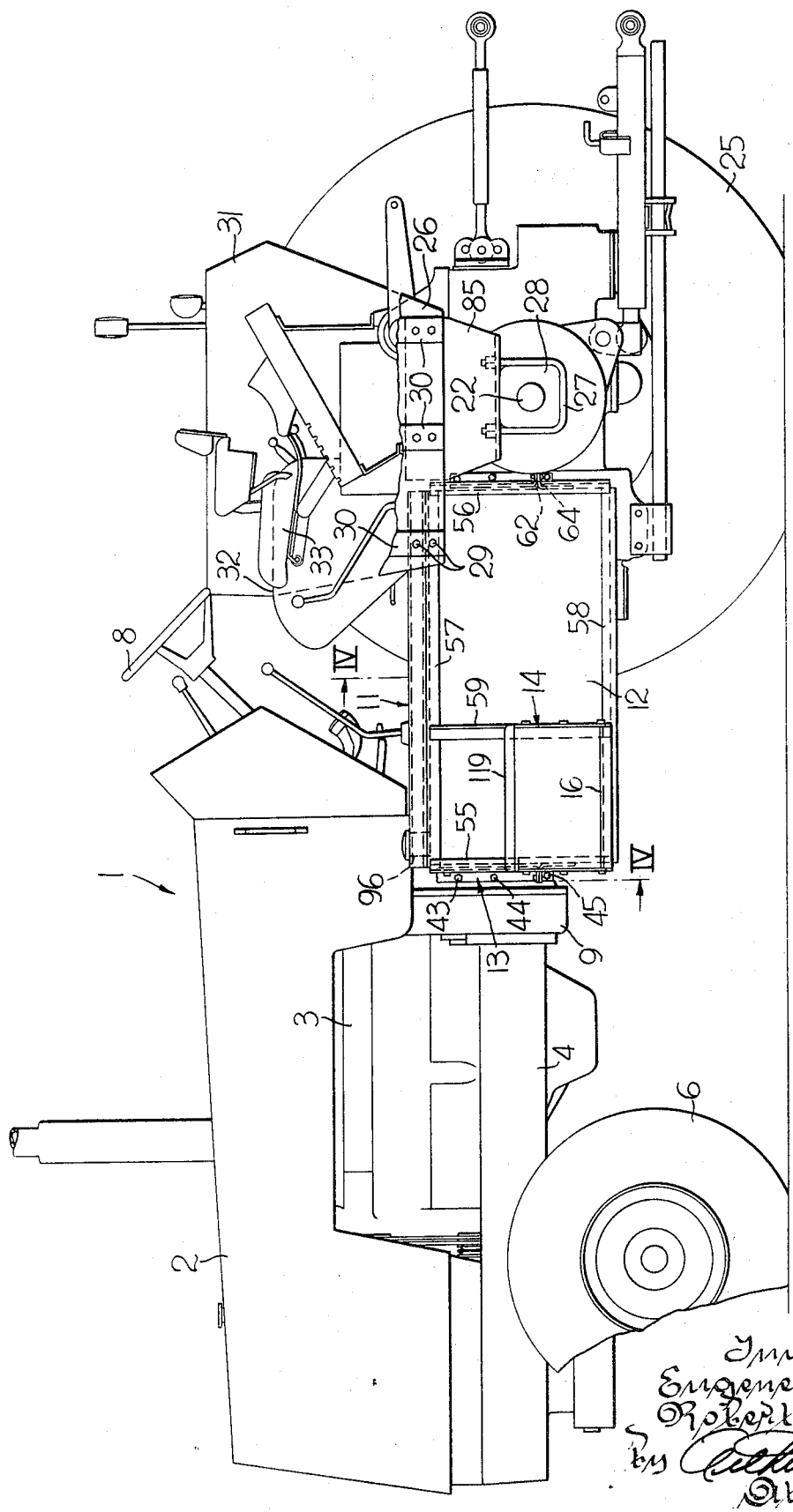

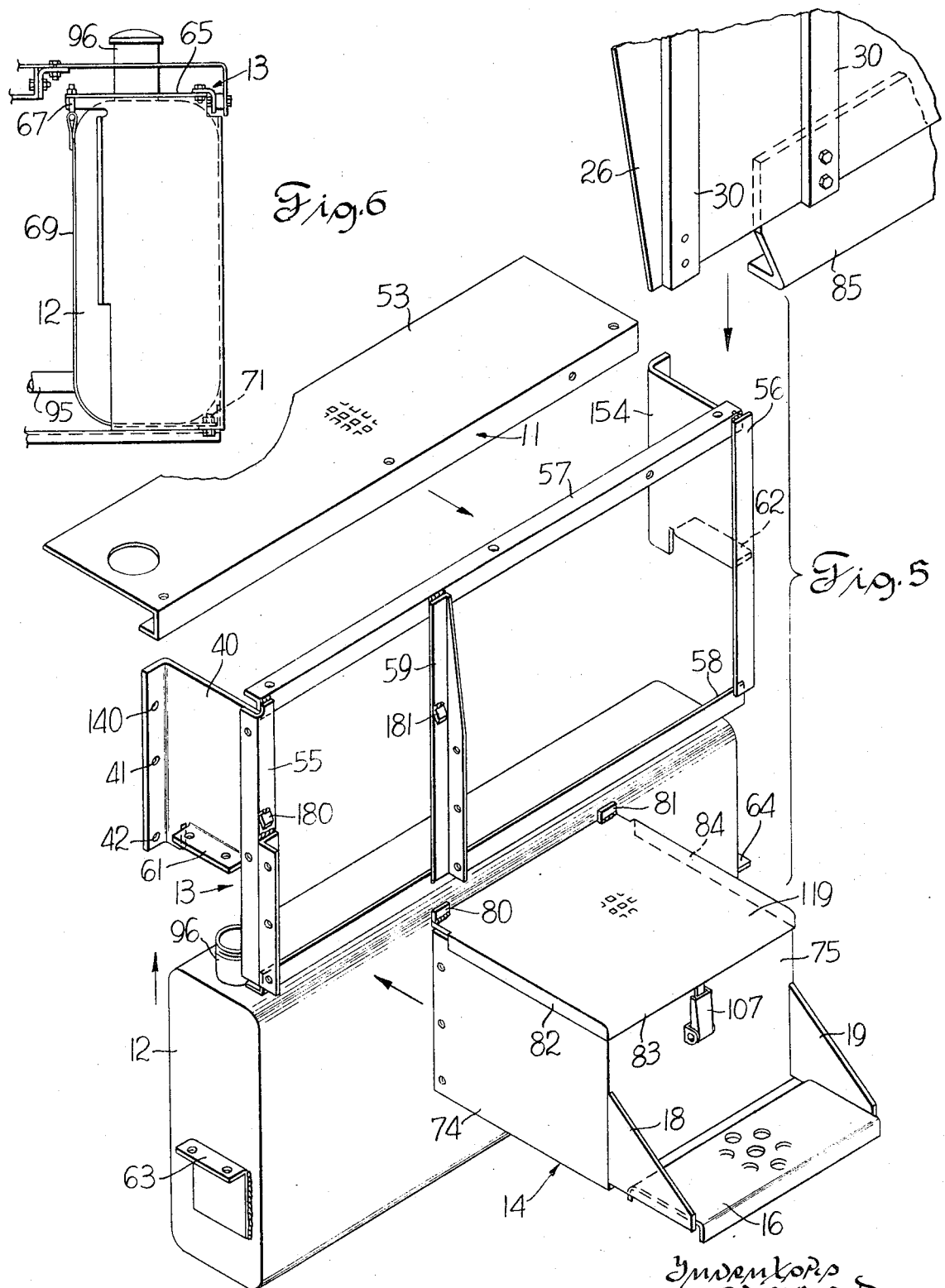

SUPPORTING STRUCTURE FOR PLATFORM DEFINING FUEL AND BATTERY COMPARTMENT

This invention relates to supporting structure for a platform on a tractor at the operator station for supporting and enclosing fuel tanks and compartments for storage of batteries, tools and other items. The structure also supports a portion of the fender and serves to efficiently conserve space on the tractor.

The conventional tractor carries a fuel tank above the engine. Positioning of the fuel tank above the engine is not entirely satisfactory because the requirement of good visibility limits the size of the fuel tank. A high center of gravity of the fuel tank tends to produce instability of the vehicle to a limited degree. A fuel tank above the tractor engine causes the fuel to overheat due to radiation and convection currents from the hot engine beneath the fuel tank and cause a vaporlock problem or a fire hazard particularly if refueling when the engine is hot.

Accordingly, this invention provides for a fuel tank positioned to fill space which is ordinarily not used on the tractor. The supporting structure of the fuel tank also provides a supporting means for the platform on the tractor at the operator station on the vehicle. By positioning the fuel tanks adjacent to the sides of the transmission and forwardly of the rear axles, the fuel tank can be supported with the structure supporting the platform on the vehicle. Extending the platform over the fuel tank increases the available area of the platform at the operator station. The fuel tank positioned at this location adds to the stability of the tractor and permits good visibility of the operator over the top of the tractor. The low positioning of the fuel tank also permits filling the fuel tank from a fuel supply tank by gravity feed since the supply tank ordinarily is positioned at a high level in the refueling area.

A platform on a tractor positioned immediately above the transmission is ordinarily too high to permit the operator to step directly from the ground to the platform level and accordingly this invention provides for steps for the operator to readily gain a position on the platform. A first step is positioned at the lower level of the fuel tank which is positioned on the side of a boxlike structure forming an enclosure for a battery. The top portion of the battery compartment defines a second step. Accordingly, the operator has two steps sufficiently high above the ground level for adequate clearance under the tractor but permitting the operator to easily step up to the platform level on the tractor.

It is an object of this invention to provide a platform and steps at the operator station on a tractor.

It is another object of this invention to provide a platform at the operator station with steps for the operator to step to the platform level with supporting structure enclosing a fuel tank.

It is another object of the invention to provide a platform and steps at the operator station and a supporting structure for supporting the platform enclosing the fuel tank and defining a battery compartment.

It is a further object of this invention to provide a platform and steps at the operator station and structure for supporting a fuel tank, a battery compartment and the fenders on the tractor and also defining an enclosure for the fuel tank and the battery which is readily excessible for maintenance.

The objects of this invention are accomplished by providing the platform supporting structure at the operator station which are fastened to both sides on the top of the chassis to provide a rigid structure and a roomy platform at the operator station. The supporting structure also defines an enclosure with a fuel tank adjacent the chassis on both sides and immediately beneath the platform. The fuel tank is fastened rigidly to the supporting structure.

Steps are provided on the side of the supporting structure which define a compartment. The compartment adapts itself well to the use of storage for one or more batteries adjacent the fuel tanks. A lower step is positioned on the side of the storage compartment at the lower level of the fuel tank. The top of the storage compartment defines a second step intermediate the upper and lower levels of the fuel tank and the platform is positioned immediately above the upper level of the fuel tank.

The preferred embodiments of this invention will be illustrated in the following patent drawings.

FIG. 1 illustrates a plan view of the tractor and the supporting structure and platform on the tractor;

FIG. 2 illustrates a side view of the tractor, the platform and supporting structure;

FIG. 5 is an exploded view of the one side of the supporting structure including a portion of the platform, the fender, the fuel tank and the battery compartment including a step; and FIG. 6 is a modification of the fuel tank carriage.

Figure 4:
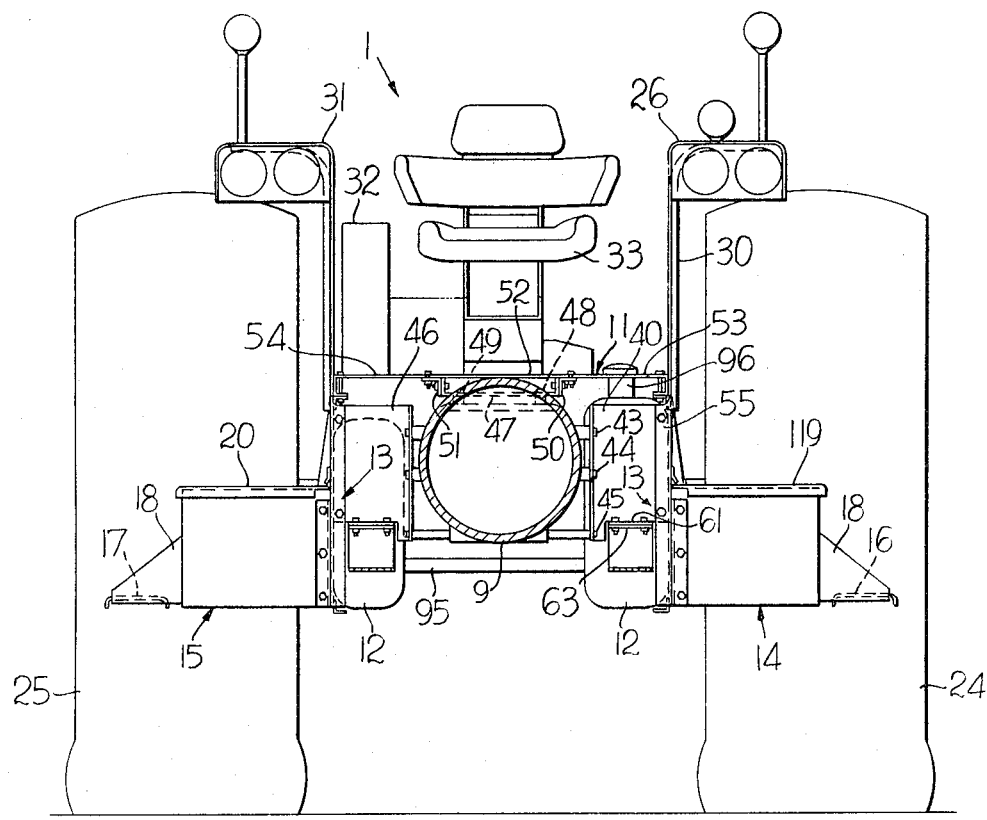
FIG. 4 is a cross section view taken on line IV—IV of FIG. 2.

The preferred embodiments of this invention are illustrated in the attached drawings and will be subsequently described.

FIGS. 1 and 2 illustrate a tractor 1 having an engine hood 2 supported on the front end of the tractor over the engine 3 and mounted on a chassis 4. The front end of the tractor 1 is supported on the front axle 5 carried on the steerable wheels 6. The steering linkage 7 and steering wheel 8 provide for steering of the tractor.

The engine 3 is connected to the transmission encased in the transmission housing 9. The transmission housing forming a part of the chassis 4 extends rearwardly to the drive gear housing 10. The transmission housing 9 and rear gear case 10 provide a rigid means for supporting the support structure for the platform, gas tanks and battery cage.

A platform 11 is supported immediately above the drive gear housing 10 and the transmission housing 9 and is suitably bolted to these housings through the supporting structure. The platform extends laterally over fuel tanks 12 which are also supported immediately under the platform 11. The support structure 13 provides a means for mounting the compartment structures 14 and 15 on the sides of the support structure. The compartment structures 14 and 15 carry a step 16, 17, which are fastened to the box structure 14 and 15 by gussets 18 and 19. The compartment structures 14 and 15 adapt themselves well for use as battery cases and are readily accessible for maintenance of the battery and positioned in a location to maintain a cool condition surrounding the battery.

The steps 16 and 17 define the first steps while the cover 119 and 20 of the compartment structures 14 and 15 define the second steps for stepping onto the platform 11.

The tractor also defines rear axle housings 28 and 21 for encasing the drive shafts 22 and 23 for driving the wheels 24 and 25, respectively. The rear axle housings 28 and 21 each provide a solid support for mounting a fender. FIG. 2 shows the fender 26 mounted with a U-bolt 27 clamping on the housing 28 for supporting the fender 26. Additional rigidity is provided by the support 13 in which the fender is fastened by means of the bolts 29 to the straps 30 of the fender and the support structure 13.

The fenders 26 and 31 are partially supported along the edge of the platform 11. The control panel 32 is positioned adjacent the fender 31 at the control station and are readily operable by the operator from the seat 33.

A platform 11 extends forwardly from the fenders transversely along the side of the rearward end of the engine hood 2. The steps 119 and 20 lead to a portion of the platform alongside of the engine hood and provide a substantial area for easily stepping onto the platform. The platform has adequate room to move around for operating of the vehicle when standing or in a sitting position.

Figure 3:
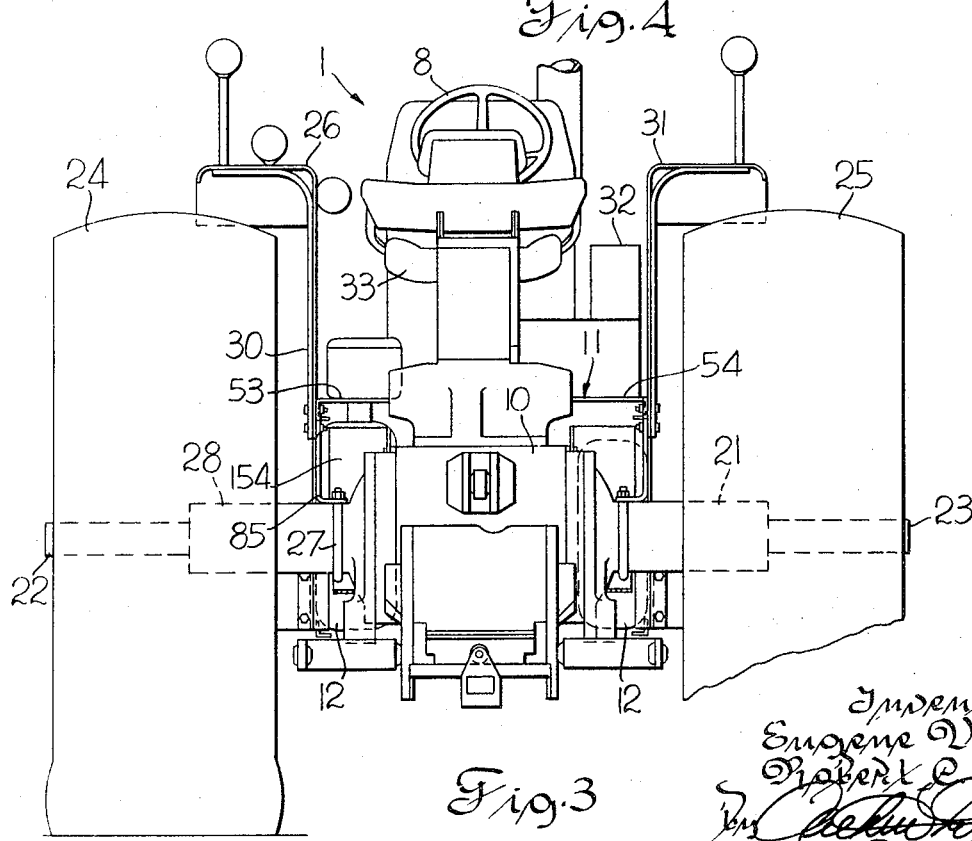
FIG. 3 illustrates the rear view of the tractor, the supporting structure for the platform and the fuel tanks and the storage compartment.

FIG. 3 illustrates a rear view of the tractor and a supporting structure for the platform 11. The rear axle housing 21 and 28 are shown with the fenders mounted on their respective housing. The U-bolt 27 is mounted on the rear axle housing 28 supporting the fender 26.

FIG. 4 illustrates a cross section view of the tractor cut immediately ahead of the platform showing the step 16 on the compartment structure 14 and step 17 on the compartment structure 15. The steps 16 and 17 are positioned on the side of the supporting structure which permits the operator to step up to the steps 119 and 20 on the side of the tractor.

The steps 119 and 20 are shown positioned for readily mounting the platform 11 as the operator steps up on the side of the tractor. The transmission housing 9 is shown in section and illustrates its supporting roll for the supporting structure 13 and the platform 11.

Referring to FIG. 5 the supporting structure and its relationship with the transmission housing is illustrated. The end plate 40 is provided with a plurality of holes 140, 41, 42 for reception of the bolts 43, 44 and 45 to fasten end plate onto the transmission housing 9. Similarly, the end plate 46 is fastened on the opposite side of the transmission housing 9.

A transverse bar 47 is fastened by the bolts 48 and 49 on the upper side of the transmission housing 9. The braces 50 and 51 are supported on the transverse bar 47 which in turn supports the platform central portion 52 of the platform 11. The platform 11 also includes the section 53 and section 54 on either side of the center portion 52. The platform is constructed of three flat plates to facilitate assembly and disassembly of the platform. The platform, however, defines a single horizontal plane for supporting the operator and the operator station.

The end plate 40 and 154 are each passing to the side of the transmission housing 9 and the drive gear housing 10, respectively. The upright member 55 is fastened to the end plate 40 while the upright member 56 is fastened to the end plate 154. The angle irons 57 and 58 connect the two upright members 55 and 56 on their upper ends and lower ends respectively. Intermediate the two uprights 55 and 56 is a third upright member 59 which also is connected between the angle irons 57 and 58. This supporting structure provides a rigid frame 13 for supporting the fuel tank 12. The frame 13 also supports the portion 53 of the platform 11.

The carriage for the fuel tank 12 is shown in which a flange 61 and a flange 62 are fastened to hangar 63 and 64, respectively on the ends of the fuel tank 12. The flanges 61 and 62 rigidly support the fuel tank 12 through the hangars.

A modification of a carriage for a fuel tank 12 is shown in FIG. 6 wherein the horizontal flange 65 extends transversely above the fuel tank 12. A rod 67 is connected to a flexible strap 69 which is fastened on its lower end by a fastening means 71. The fuel tank is fitted above two flexible straps and each strap can be tightened to snugly seat the fuel tank against the upper portion of the frame 13 to provide a supported carriage for the fuel tank.

A compartment structure 14 includes a forward wall 74 and a rearward wall joined together by the wall 75 to form a receptacle defining a storage compartment. The storage compartment adapts itself well to use as a battery compartment on the vehicle. The compartment structure provides a means for the supporting step 16 by means of the gussets 18 or 19. The cover 119 is provided with tabs at 80 and 81 on the inner end of the cover 119, which slide underneath the locks 180 and 181. As the cover 119 is allowed to reseat itself on the top of the compartment structure 14, the flanges 82, 83 and the flange 84 confine the cover to a fixed position on top of the compartment structure 14 and form the step on the intermediate portion of the frame 13. The latch 107 retains the cover 119 in the fixed position on the compartment structure 14.

The reinforcing mount 85 connected to the fender 26 and the reinforcing straps 30 serve to stiffen the fender 26 in its fastening to the frame 13 and the drive gear housing 10.

The opposite side of the supporting structure includes a symmetrical frame 13 including a storage compartment structure 15 and a step 17 providing accessibility to the platform 11.

A phantom view of a step 90 is also shown in FIG. 1 immediately in front of the compartment structure 14 which illustrates another embodiment of positioning of the step. The accessability to the tractor is similar, however, due to personal preference the width of the tractor at this point may be reduced by positioning a step on the front in preference to the side mounting as shown.

Another embodiment of the steps is shown on the opposite side of the tractor which shows lower step 106 and second step 105. The compartment structure provides a larger compartment volume with greater step surface of step 105.

The preferred embodiments in this invention have been illustrated and described. It can be readily seen that the platform 11 provides roominess at the operator station to permit the operator to operate the tractor in the seated position or in the standing position. The platform extends forwardly along the side of the transmission housing and the rear portion of the engine hood and extends rearwardly to the control panel and over the rear gear case to the rear drive gear housing. The platform defines a single horizontal plane for safety and convenience.

The fuel tanks are positioned immediately below the platform and are suspended in a manner whereby the supporting structure supports the fuel tank on either side of the transmission and drive gear housings. The tanks are connected by a conduit 95 which extends transversely between the fuel tanks so that the fuel tanks can be filled through a single filler pipe 96. Suitable venting and fuel lines to the engine are also provided. The fuel tanks are well supported in an enclosure defined by the frames 13 on the sides of the tractor. The fuel tanks are positioned with a low center gravity to facilitate filling of the fuel tanks through gravity means from a supply tank normally positioned at a conventional height in a refueling area.

The frame 13 also supports compartment structure 14 which may be used as a tool box or preferably for a battery compartment. One or two batteries may be positioned in the compartment as may be required by the particular size and requirements of the engine. The support structure forms steps for conveniently stepping onto the platform of the tractor.

The frame 13 also provides a supporting means for a portion of the fenders 26 and 31. The fenders form a well supported wheel guard to promote safety for the operator in the operator station.

We claim:

1. A supporting structure on a tractor for supporting a platform at the operator's station comprising, a bracket means fastened on each side of the tractor chassis defining a fuel tank opening, a fuel tank connected to each of said bracket means received in said opening defined by said bracket means, compartment means connected to said bracket means defining a storage compartment on the side of said vehicle, a cover on said compartment means defining a substantially horizontal plane for use as a step to step up to the platform, said platform supported on the upper portion of said bracket means defining a platform surface immediately above the fuel tanks and the chassis at the operator's station of the tractor, said supporting structure thereby defining a supporting means for the platform fuel tanks and storage compartment means.

2. A supporting structure on a tractor for supporting a platform as set forth in claim 1 including a fender connected to said bracket means on both sides of said platform and adapted for being partially supported on a rear axle housing of said tractor to thereby provide a fender adjacent the lateral delineation of said platform.

3. A supporting structure on a tractor for supporting a platform as set forth in claim 1 wherein said compartment means defines a battery compartment laterally of said bracket means and forwardly of the wheel for receiving at least one battery in each compartment for use on the tractor.

4. A supporting structure on a tractor for supporting a platform as set forth in claim 1 wherein said compartment means defines a step formed by the upper surface of said compartment means, another step connected to said compartment means defining another substantially horizontal plane adapted for use as a second step thereby providing steps for access to said platform.

5. A supporting structure on a tractor for supporting a platform as set forth in claim 1 including means supporting another step defining a horizontal plane positioned at the lower level of said fuel tank, said step formed by said compartment means defines a plane intermediate the lower level of said fuel tank and the upper level of said fuel tank thereby providing convenient stepping levels.

6. A supporting structure on a tractor for supporting a platform as set forth in claim 1 wherein said bracket means defines flange means for hanging said fuel tank, each of said fuel tanks include hangar means adapted for connection to said flange means, and fastening means for connecting said flange means with said hangar means to thereby support said fuel tank on said bracket means.

7. A supporting structure on a tractor for supporting a platform as set forth in claim 1 wherein said compartment means includes a removable cover for positioning on the top of said compartment means, a latch on said cover to retain said cover in a fixed position on said compartment means permitting opening of said cover for access to said storage compartment.

8. A supporting structure on a tractor for supporting a platform as set forth in claim 1 including said platform mounted on said bracket means including removable sections having fastening means to permit disassembly for access beneath the platform area.

9. A supporting structure on a tractor for supporting a platform as set forth in claim 1 wherein said bracket means includes a fuel tank support means including at least one strap connected to a lower end of said bracket means and extending inwardly and upwardly around said fuel tank, adjustable fastening means on the upper end of said strap for tightly nestling said fuel tank against said bracket means thereby permanently supporting said fuel tank.

10. A supporting structure on a tractor for supporting a platform as set forth in claim 1 including means connecting another step to said compartment means lateral at the bracket means and defining a horizontal surface at a position at the lower edge of said fuel tank, thereby providing two steps transverse of said bracket means to permit access for stepping onto said platform.

11. A supporting structure on a tractor for supporting a platform as set forth in claim 1, including means connecting another step forwardly of the forward end of said bracket means.

* * * * *